United States Patent [19]

Stow

[11] Patent Number: 4,793,095
[45] Date of Patent: Dec. 27, 1988

[54] AQUEOUS ROOTING GEL

[75] Inventor: Michael W. Stow, Ipswich, Great Britain

[73] Assignee: Fisons plc, Ipswich, United Kingdom

[21] Appl. No.: 2,716

[22] PCT Filed: Feb. 26, 1986

[86] PCT No.: PCT/GB86/00102
§ 371 Date: Nov. 4, 1986
§ 102(e) Date: Nov. 4, 1986

[87] PCT Pub. No.: WO86/05065
PCT Pub. Date: Sep. 12, 1986

[30] Foreign Application Priority Data

Mar. 9, 1985 [GB] United Kingdom ............... 85/06153

[51] Int. Cl.$^4$ ............ A01G 9/10; C05G 3/00
[52] U.S. Cl. ................. 47/59; 47/DIG. 10; 47/DIG. 3; 71/77
[58] Field of Search ............ 428/421; 71/92, 93, 71/77; 47/77, 58, DIG. 3, DIG. 10; 524/236; 548/222

[56] References Cited

U.S. PATENT DOCUMENTS

| | | | |
|---|---|---|---|
| 3,936,383 | 2/1976 | Daimon | 428/421 |
| 4,226,990 | 10/1980 | Kay | 71/93 |
| 4,241,537 | 12/1980 | Wood | . |
| 4,248,619 | 2/1981 | Serban | 71/92 |
| 4,328,641 | 5/1982 | Tesch | 47/77 X |
| 4,354,065 | 10/1982 | Serban | 548/222 |
| 4,358,307 | 11/1982 | Serban | 71/92 |
| 4,391,637 | 7/1983 | Mardis | 524/236 |
| 4,675,047 | 6/1987 | Serban | 71/92 |

FOREIGN PATENT DOCUMENTS 6299 1/1980 European Pat. Off. .

Primary Examiner—Robert A. Hafer
Assistant Examiner—Danton D. DeMille
Attorney, Agent, or Firm—Marshall, O'Toole, Gerstein, Murray & Bicknell

[57] ABSTRACT

Aqueous rooting gel which comprises a thixotropic gel of hectorite in water containing at least 60 ppm, and preferably not more than 200 ppm calcium ions. There is also provided a transparent container including such a rooting gel. The gels are useful for rooting a wide variety of soft wood cuttings, eg fuchsia and geranium.

9 Claims, No Drawings

AQUEOUS ROOTING GEL

This invention relates to an aqueous rooting gel, which is preferably translucent.

Plants are frequently propagated by taking cuttings and placing them in a growth medium such as soil or a peat based compost. These conventional growth media suffer from the disadvantage that the growth medium has to be kept moist. Furthermore, the composition of naturally occurring materials such as peat or soil varies and consistently reproducible agronomic results from a number of samples are difficult to obtain.

Thixotropic gels, of various types including gels prepared from silica, clays and organic materials have been proposed in European patent application No. 0 006 299 as propagating media for cuttings. However, we have found that gels prepared in accordance with European patent application No. 0006299 are unsatisfactory in a number of respects and in particular do not comprise a reliable medium for the rooting of cuttings.

We have found that two essential elements are required for a satisfactory cutting medium; firstly the gel has to be a hectorite gel; secondly the gel has to contain at least 60 pm calcium ions.

According to the invention there is provided an aqueous rooting gel which comprises a thixotropic gel of hectorite in water containing at least 60 ppm calcium ions.

The gel preferably contains at least 75, more preferably at least 90 ppm calcium ions.

The gel suitably contains not more than 200 ppm calcium ions, preferably not more than 150 ppm calcium ions and especially not more than 130 ppm. The gel most suitably contains between 60 and 130 ppm calcium ions, e.g. 100±10 ppm calcium ions.

The gels in accordance with the invention are generally clear, and to ensure such clarity it is desirable that the calcium ion concentration is less than 130 ppm.

Gels with a calcium ion concentration of greater than 130 ppm which are sufficiently clear to enable visualisation of roots less than 0.2 cm in length on cuttings placed in the centre of a 7 cm diameter transparent pot may be prepared by adding a calcium ion complexing agent, e.g. sodium hexametaphosphate, to the gel. The quantity of complexing agent to be added to obtain a sufficiently clear gel will depend on the nature of the complexing agent and on the quantity of calcium ions to be complexed. However we have found that it is possible to prepare clear gels with a total calcium ion concentration of 150 ppm by adding 315 mg/litre of sodium hexametaphosphate. A clear gel having a calcium ion concentration of 200 ppm may be prepared by adding 840 mg/litre sodium hexametaphosphate to the gel.

By the term hectorite is meant a trioctahedral clay which is a member of the saponite sub-group of smectites. The term hectorite has been ascribed to the natural trioctahedral smectites found at Hector, California, USA. Hectorites can be represented by the general or idealised formula:

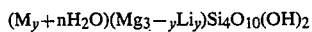

$$(M_y{}^+ \cdot nH_2O)(Mg_{3-y}Li_y)Si_4O_{10}(OH)_2$$

where M is an exchangeable cation, preferably sodium and where y is a number which is generally less than 1.0.

The hectorite may be of natural origin, but more usually is synthetic.

The hectorite preferably comprises from 58 to 63 parts by weight $SiO_2$, 25 to 30 parts by weight MgO, 2.2 to 2.8 parts by weight $Na_2O$, 0.65 to 0.90 parts by weight $Li_2O$ and from 0.15 to 0.40 parts by weight sulphate. It is preferably fluoride free.

The particle size of the hectorite used in the preparation of the gel is preferably such that at least 98% passes through a 0.25 mm sieve.

The calcium ion concentration is preferably obtained by the addition of a calcium salt to the water used to prepare the gel, but other methods of incorporation may also be used, such as addition during formation of the gel. The calcium salt should be of sufficient solubility to dissolve in the aqueous medium, and may be calcium sulphate, calcium chloride, calcium nitrate or monocalcium phosphate. It is preferred to use calcium sulphate dihydrate.

The concentration of hectorite in the aqueous phase should be sufficient to yield a thixotropic gel which comprises the rooting gel of the invention. It is preferred that the concentration of hectorite is in the range 1 to 10%, preferably 2 to 6%, more preferably 2 to 4% w/v.

It has also been found that the structural integrity of the gel over a period of time may be dependent on the type of container in which it is placed. For example in containers made of transparent polystyrene, polyethylene, or polyvinyl chloride, we have found that the gel tends to fissure. We have identified that this is due to loss of water through the walls of the container.

It has been found that by using containers made of transparent material with very low water transmission rates, this problem is overcome.

According to one embodiment of the invention, there is provided a transparent container including the rooting gel as hereinbefore described.

The container is preferably made from a transparent material with a low water transmission rate.

Suitable materials include, for example, polypropylene, in particular homopolymer polypropylene.

The wall thickness of the container is preferably in the range 0.3 to 0.7, e.g. 0.5 m.

The open end of the container should be covered before and during use, e.g. using a metal foil, in order that water loss from container is minimised. Prior to use, for example, a metal foil closure can be sealed to the rim of the container.

The rooting gel according to the invention may be prepared by any conventional method for the manufacture of a thixotropic gel. The hectorite is dispersed in water, preferably demineralised water, which contains the required amount of the calcium salt, and the rooting gel is obtained, which is filled into the appropriate containers. In a typical procedure the required amount of hectorite is dispersed in water having the preferred calcium ion content, preferably at a temperature between 25° C. and 35° C., more preferably between 28° and 32° C., with the aid of a high energy mixer.

Providing the calcium content is restricted to below 130 ppm and other additives are avoided, the gel will be translucent, thus permitting root formation to be observed.

The invention is illustrated by the following example.

EXAMPLE

A thixotropic gel was prepared from 30 g of a fluoride free synthetic sodium lithium magnesium silicate hectorite comprising 60 to 61% by weight $SiO_2$, 27 to 28% by weight MgO, 2.4 to 2.6% by weight Na₂O, 0.72 to 0.82% by weight Li₂O, 0.21 to 0.29% by weight sulphate, a moisture content of from 6 to 8% by weight, and a weight loss on ignition of 8.8 to 9.1% is dispersed in demineralised water (1 liter) containing 100 ppm calcium ions at 30° C. using a high energy stirrer. The gel (ca 150 ml) was poured into polypropylene pots of 170 ml capacity. A polypropylene-aluminum foil laminate lid was applied to the rim of each pot and heat sealed in place. The gel produced was clear and remained clear for at least 18 months when stored at ambient temperatures, without forming fissures or deteriorating.

In use, the foil cap was punctured to produce small holes and soft wood cuttings were inserted through the holes into the gel to a depth of 2-4 cm. Cuttings were taken according to normal horticultural practice. Where desired, the cuttings were first dipped into rooting hormone.

Roots developed on the cuttings, e.g. fuchsia, hedera, geranium, which could be readily seen. In addition, very little fissuring of the gels occurred during the initial rooting period.

What we claim is:

1. An aqueous rooting gel which comprises a thixotropic gel of hectorite in water containing at least 60 and not more than 200 ppm calcium ions, wherein said hectorite comprises from 58 to 63 parts by weight $SiO_2$, 25 to 30 parts by weight MgO, 2.2 to 2.8 parts by weight $Na_2O$, 0.65 to 0.90 parts by weight $Li_2O$ and from 0.15 to 0.40 parts by weight sulphate and said gel comprises from 1 to 10% weight/volume of said hectorite.

2. A rooting gel according to claim 1, which contains from 60 to 130 ppm calcium ions.

3. A rooting gel according to claim 1, wherein the hectorite is synthetic.

4. A transparent container containing an aqueous rooting gel which comprises a translucent thixotropic gel of hectorite in water containing at least 60 and not more than 200 ppm calcium ions, wherein said hectorite comprises from 58 to 63 parts by weight $SiO_2$, 25 to 30 parts by weight MgO, 2.2 to 2.8 parts by weight $Na_2O$, 0.65 to 0.90 parts by weight $Li_2O$ and from 0.15 to 0.40 parts by weight sulphate and said gel comprises from 1 to 10% weight/volume of said hectorite.

5. A container according to claim 4, wherein the container is made from a transparent material with a low water transmission rate.

6. A container according to claim 8, wherein the container is made from polypropylene.

7. A container according to claim 4, having a wall thickness of from 0.3 to 0.7 mm.

8. A container according to claim 4 including a cover.

9. A container according to claim 8, wherein the cover is metal foil.

* * * * *